United States Patent
Steele et al.

(10) Patent No.: US 6,794,075 B2
(45) Date of Patent: Sep. 21, 2004

(54) FUEL CELLS

(75) Inventors: Brian Charles Hilton Steele, Surrey (GB); Alan Atkinson, Oxon (GB); John Anthony Kilner, Surrey (GB); Nigel Peter Brandon, Surrey (GB); Robert Arthur Rudkin, Essex (GB)

(73) Assignee: Ceres Power Limited, London (GB)

( * ) Notice: Subject to any disclaimer, the term of this patent is extended or adjusted under 35 U.S.C. 154(b) by 532 days.

(21) Appl. No.: 09/982,088

(22) Filed: Oct. 19, 2001

(65) Prior Publication Data

US 2002/0048699 A1 Apr. 25, 2002

(30) Foreign Application Priority Data

Oct. 25, 2000 (GB) .............................................. 0026140

(51) Int. Cl.$^7$ ................................................ H01M 8/10
(52) U.S. Cl. ....................... 429/30; 4229/30; 4229/33; 4229/34; 4229/35; 4229/38
(58) Field of Search ............................. 429/30, 33, 34, 429/35, 38

(56) References Cited

U.S. PATENT DOCUMENTS 5,624,769 A    4/1997  Li et al. ........................ 429/32

6,444,340 B1 * 9/2002 Jaffrey .......................... 429/30

FOREIGN PATENT DOCUMENTS

EP    0 098 605    1/1984
JP    10092446     4/1998

OTHER PUBLICATIONS

Patent Abstracts of Japan, vol. 2000, No. 12, Jan. 2001 (JP2000 239806).

Patent Abstract of Japan, vol. 2000, No. 13, Feb. 2/2001 (JP2000 277133).

* cited by examiner

Primary Examiner—Bruce F. Bell
(74) Attorney, Agent, or Firm—Nixon & Vanderhye P.C.

(57) ABSTRACT

A solid oxide fuel cell, comprising: a ferritic stainless steel substrate including a porous region and a non-porous region bounding the porous region; a ferritic stainless steel bi-polar plate located under one surface of the porous region of the substrate and being sealingly attached to the non-porous region of the substrate about the porous region thereof, a first electrode layer located over the other surface of the porous region of the substrate; an electrolyte layer located over the first electrode layer; and a second electrode layer located over the electrolyte layers.

45 Claims, 3 Drawing Sheets

FUEL CELLS

BACKGROUND OF THE INVENTION

1. Field of the Invention

The present invention relates to fuel cells, and in particular intermediate-temperature solid oxide fuel cells (IT-SOFCs) which are typically used in stacks to generate a power output of from 1 to 100 kW and find application as local power generators, for example, in remote locations, such as for residential combined heat and power (CHP) generation, and in vehicles, either as a primary power unit (PPU), an auxiliary power unit (APU) or to drive other equipment, such as air-conditioning equipment.

For solid oxide fuel cells other than those integrated with a gas turbine, the fuel cells should be operated at the lowest temperature possible without compromising the electrode kinetics and electrolyte resistance.

2. Description of the Prior Art

Using known fabrication routes in the fabrication of ceramic electrolytes, it is generally accepted that the minimum film thickness that can be reliably fabricated is about 10 μm. This minimum electrolyte thickness establishes a minimum operating temperature, typically about 650° C. for scandia-stabilised zirconia (SSZ) electrolytes, about 700° C. for yttria-stabilised zirconia (YSZ) electrolytes, and about 500° C. for doped ceria electrolytes, such as gadolinia-doped ceria (CGO) electrolytes. Further, the use of such a thin electrolyte film requires a substrate in order to provide a fuel cell having the necessary robustness.

For zirconia-based electrolytes, for example YSZ, a porous NiO—YSZ anode substrate typically having a thickness in the range of from 250 to 500 μm is commonly used. Numerous techniques have been used to deposit electrolyte films on substrates. These techniques include screen printing, tape casting, vacuum slip casting, electrophoretic deposition, calendering, spray pyrolysis, sputtering and plasma spraying. In such fuel cells, the electrolyte film and the substrate are usually co-fired at high temperature, typically about 1400° C., to ensure that the electrolyte film is dense and impermeable to gaseous molecules.

Whilst NiO—YSZ/YSZ structures have been successfully fabricated, the use of an NiO—YSZ substrate does give rise to a number of problems. These problems include poor thermal expansion compatibility, NiO—YSZ having a coefficient of thermal expansion in the range of 12 to 13×10$^{-6}$ K$^{-1}$ as compared to 10.6×10$^{-6}$ K$^{-1}$ for YSZ. NiO—Al$_2$O$_3$ and NiO—TiO$_2$ substrates, which do have an improved thermal expansion match, are being developed, but these substrates still require a thin active interfacial layer of NiO—YSZ between the substrate and the electrolyte film to promote the electrochemical oxidation of the fuel. Another problem associated with the use of an NiO—YSZ substrate is the volume change associated with the reduction of the NiO component to Ni when in contact with the gaseous fuel. This volume change weakens the substrate and requires the fuel to be initially introduced very slowly into the stack to accommodate the volume change. Furthermore, with the use of an NiO—YSZ substrate, it is essential to ensure that the anode compartment remains sufficiently reducing so as to ensure that the Ni is not oxidised back to NiO, particularly during any cooling cycles.

Owing in part to the above-mentioned disadvantages of the ceramic NiO—YSZ substrate, the use of porous metallic substrates has been proposed, as disclosed, for example, in GB-A-1049428. The principal advantages of metallic substrates are recognised as the excellent mechanical behaviour and the improved electrical and thermal conductivity. However, the use of metallic substrates constrains the maximum fabricating temperature to about 1000° C., which temperature is below that required to sinter supported zirconia-based electrolytes into a dense impermeable film. Also, it is necessary to seal around the periphery of the porous substrate to prevent mixing of the gaseous oxidant and fuel. Currently, brittle glass, glass-ceramic or composite metal/ceramic seals are used for this purpose, which seals often crack during the thermal cycling experienced during operation.

As a consequence of the limitation to the fabrication temperature introduced by using metallic substrates, GB-A-1049428 discloses the use of plasma spraying to prepare dense films of zirconia-based electrolytes. Whilst plasma spraying can be used to deposit electrolyte films, that deposition technique is relatively expensive, in particular being wasteful of the expensive ceramic powder. Other physical vapour deposition (PVD) techniques have also been used to deposit thin electrolyte films, but these techniques are also relatively expensive and not as convenient as the conventional ceramic processing routes. Chemical vapour deposition (CVD) techniques have also been used to deposit thin electrolyte films, but these techniques are still more expensive and likewise not as convenient as the conventional ceramic processing routes.

Alternative fuel cell designs have also been proposed, such as the circular fuel cell design as disclosed, for example, in U.S. Pat. Nos. 5,368,667, 5,549,983 and 5,589,017. In this circular design, the gaseous oxidant and fuel are introduced via a manifold at the centre of the fuel cell stack, and the distribution and flow rate of the gaseous oxidant and fuel are arranged such as to ensure almost complete conversion of the fuel prior to reaching the periphery of the stack. With this design, only one brittle glass or glass-ceramic seal is required at the central manifold as the excess oxidant and fuel are combusted at the periphery of the stack. Although this fuel cell design represents an improvement, the brittle glass, glass-ceramic or composite metal/ceramic seal required at the central manifold is still liable to crack during the rapid thermal cycling experienced during operation. Moreover the maximum diameter of this circular design SOFC is typically limited to about 15 cms due to fabrication constraints. Accordingly the electrical power than can be generated within a single stack is limited.

It is thus an aim of the present invention to provide a solid oxide fuel cell and a method of fabricating the same which utilises a metallic substrate, enables the fabrication of a ceramic electrolyte film by sintering, and avoids the need to use brittle seals.

SUMMARY OF THE INVENTION

Accordingly, the present invention provides a solid oxide fuel cell, comprising: a ferritic stainless steel substrate including a porous region and a non-porous region bounding the porous region; a ferritic stainless steel bi-polar plate located under one surface of the porous region of the substrate and being sealingly attached to the non-porous region of the substrate about the porous region thereof; a first electrode layer located over the other surface of the porous region of the substrate; an electrolyte layer located over the first electrode layer; and a second electrode layer located over the electrolyte layer.

Preferably, the ferritic stainless steel is a ferritic stainless steel containing no aluminium.

Preferably, the ferritic stainless steel is a titanium/niobium stabilised ferritic stainless steel.

More preferably, the ferritic stainless steel contains from about 17.5 to 18.5 wt % Cr (European designation 1.4509).

Preferably, the substrate has a thickness of from about 50 to 250 μm.

More preferably, the substrate has a thickness of from about 50 to 150 μm.

Yet more preferably, the substrate has a thickness of about 100 μm.

Preferably, the porous region of the substrate includes a plurality of through apertures fluidly interconnecting the one and other surface of the substrate.

More preferably, the apertures are uniformly spaced.

Preferably, the apertures have a lateral dimension of from about 5 to 250 μm.

More preferably, the apertures have a lateral dimension of from about 20 to 50 μm.

Yet more preferably, the apertures have a lateral dimension of about 30 μm.

Preferably, the apertures comprise from about 30 to 65 area % of the porous region of the substrate.

More preferably, the apertures comprise from about 50 to 55 area % of the porous region of the substrate.

Preferably, the substrate includes an active coating of an electronically-conductive oxide.

In one embodiment the active coating is a perovskite oxide mixed conductor.

Preferably, the perovskite oxide mixed conductor comprises $La_{1-x}Sr_xCO_yFe_{1-y}O_{3-\delta}$, where $0.5 \geq x \geq 0.2$ and $0.3 \geq y \geq 0$.

More preferably, the perovskite oxide mixed conductor comprises one of $La_{0.6}Sr_{0.4}Co_{0.2}Fe_{0.8}O_{3-\delta}$, $La_{0.5}Sr_{0.5}CoO_{3-\delta}$, $Gd_{0.5}CoO_{3-\delta}$, and $Sm_{0.5}Sr_{0.5}CoO_{3-\delta}$.

In another embodiment the active coating comprises doped $LaMnO_3$.

In one embodiment the substrate includes a recess in which the first electrode layer is at least partially located.

Preferably, the substrate comprises a foil.

Preferably, the substrate is a photo-chemically machined and/or laser machined substrate.

In other embodiments the substrate could be composed of a porous sintered metal powder region joined to a non-porous region. The thickness of such a sintered metal powder substrate would typically be in the region of 250 to 1000 μm.

Preferably, one or both of the first and second electrode layers has a thickness of from about 10 to 25 μm.

More preferably, one or both of the first and second electrode layers has a thickness of from about 10 to 15 μm.

Preferably, one or both of the first and second electrode layers is a sintered material.

In a preferred embodiment one of the first and second electrode layers comprises a sintered powdered mixture of perovskite oxide mixed conductor and rare earth-doped ceria.

Preferably, the powdered mixture comprises about 60 vol % of perovskite oxide mixed conductor and about 40 vol % of rare earth-doped ceria.

Preferably, the perovskite oxide mixed conductor comprises $La_{1-x}Sr_xCo_yFe_{1-y}O_{3-\delta}$, where $0.5 \geq x \geq 0.2$ and $1 \geq y \geq 0.2$.

More preferably, the perovskite oxide mixed conductor comprises one of $La_{0.6}Sr_{0.4}Co_{0.2}Fe_{0.8}O_{3-\delta}$, $La_{0.5}Sr_{0.5}CoO_{3-\delta}$, $Gd_{0.5}CoO_{3-\delta}$, and $Sm_{0.5}Sr_{0.5}CoO_{3-\delta}$.

Preferably, the rare earth-doped ceria comprises $Ce_{1-x}RE_xO_{2-x/2}$, where RE is a rare earth and $0.3 \geq x \geq 0.05$.

More preferably, the rare earth-doped ceria comprises $Ce_{0.9}Gd_{0.1}O_{1.95}$.

In one embodiment the one of the first and second electrode layers is the first electrode layer provided as a cathode layer.

In a preferred embodiment the other of the first and second electrode layers comprises a sintered powdered mixture of NiO and rare earth-doped ceria.

Preferably, the powdered mixture comprises about 50 vol % of NiO and about 50 vol % of rare earth-doped ceria or un-doped ceria.

Preferably, the rare earth-doped ceria comprises $Ce_{1-x}RE_xO_{2-x/2}$, where RE is a rare earth and $0.3 \geq x \geq 0.05$.

More preferably, the rare earth-doped ceria comprises $Ce_{0.9}Gd_{0.1}O_{1.95}$.

In a particularly preferred embodiment the other of the first and second electrode layers is the second electrode layer provided as an anode layer.

Preferably, the electrolyte layer has a thickness of from about 5 to 30 μm.

In one embodiment the electrolyte layer comprises a sintered powdered mixture of rare earth-doped ceria and cobalt oxide.

Preferably, the sintered powdered mixture comprises about 98 mole % rare earth-doped ceria and about 2 mole % cobalt oxide.

Preferably, the rare earth-doped ceria comprises $Ce_{1-x}RE_xO_{2-x/2}$, where RE is a rare earth and $0.3 \geq x \geq 0.05$.

More preferably, the rare earth-doped ceria comprises $Ce_{0.9}Gd_{0.1}O_{1.95}$.

In another embodiment the electrolyte layer comprises a sintered layer of doped ceria.

The present invention further provides a fuel cell stack comprising a plurality of the above-described fuel cells.

The power output and scalability of the fuel cell are improved in preferred embodiments in which an array of elements each comprising a first electrode layer, an electrolyte layer and a second electrode layer are provided upon said substrate.

In a preferred embodiment the present invention avoids the need to use brittle seals by using a metal foil substrate including a porous region fabricated by photo-chemical machining and cell compositions that allow operation at 500° C. or below. This relatively low operating temperature allows the use of commercially available compliant gaskets to seal the internal manifold configuration incorporated in the bi-polar plates.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
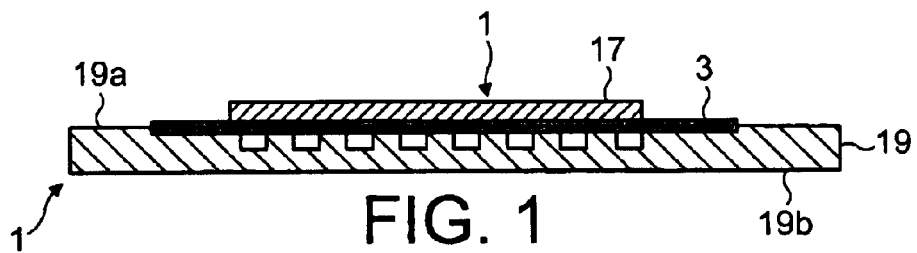
FIG. 1 illustrates a vertical sectional view of a fuel cell in accordance with a preferred embodiment of the present invention.
Figure 2:
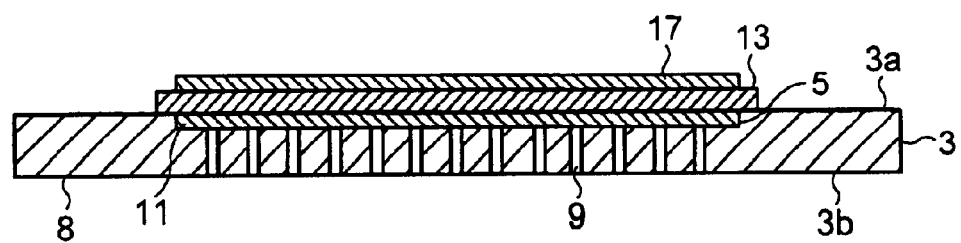
FIG. 2 illustrates in enlarged scale a vertical sectional view of part of the fuel cell of FIG. 1.
Figure 3:
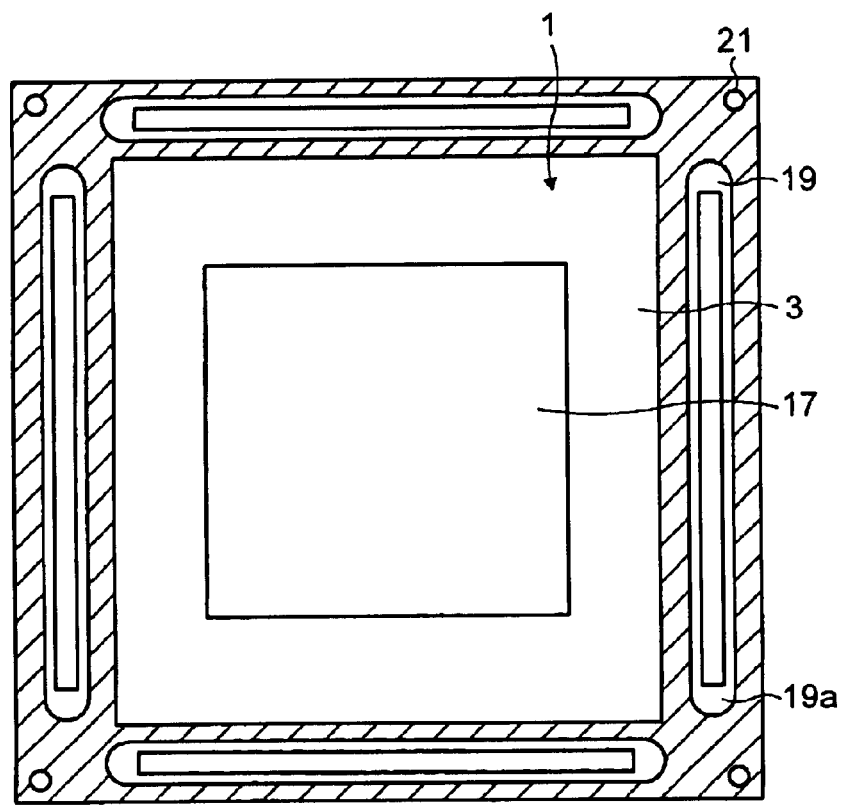
FIG. 3 illustrates a plan view of the fuel cell of FIG. 1, with a peripheral seal located thereon.

The fuel cell 1 includes a ferritic stainless steel substrate 3, in this embodiment a foil having a thickness of 100 $\mu$m. In other embodiments the substrate could be composed of a porous sintered metal powder region joined to a non-porous region. The thickness of such a sintered metal powder substrate would typically be in the region of 250 to 1000 $\mu$m. In this embodiment the foil substrate 3 includes an active coating which provides protection from the operating environment and is such as to provide sufficient conductivity as to provide good current pathways and allow good interfacial contact. Preferred coatings include doped $LaMnO_3$ (LMO), $La_{0.6}Sr_{0.4}Co_{0.2}Fe_{0.8}O_{3-x}$ (LSCF), $La_{0.5}Sr_{0.5}CoO_{3-\delta}$, $Gd_{0.5}CoO_{3-\delta}$, and $Sm_{0.5}Sr_{0.5}CoO_{3-\delta}$. One suitable ferritic stainless steel is a titanium/niobium stabilised stainless steel containing from 17.5 to 18.5 wt % Cr (European designation 1.4509). The foil substrate 3 includes a recess 5, in this embodiment of square shape, in one surface 3a thereof, a porous region 7 which is adjacent the recess 5 and includes a plurality of apertures 9 fluidly interconnecting the recess 5 and the other surface 3b of the foil substrate 3, and a non-porous region 8 bounding the porous region 7. In this embodiment the recess 5 and the apertures 9 in the foil substrate 3 are formed by photochemical machining (PCM) and/or laser machining which allows excellent control over the shape and area of the porous region 7, the pore shape and size and the fractional porosity, as these parameters can be specified in the initial photo-lithograph image. Photochemical machining and/or laser machining also provides a very flat surface for subsequent deposition processes. Further, photo-chemical machining and/or laser machining is well-suited to mass production.

The fuel cell 1 further includes a porous electrode layer 11, in this embodiment a cathode layer having a thickness of from 10 to 15 $\mu$m, deposited in the recess 5 in the foil substrate 3 by any conventional ceramic processing technique, in particular screen printing and tape casting. In this embodiment the cathode layer 11 is fabricated from a cathode composition comprising a mixture of 60 vol % of LSCF powder and 40 vol % of $Ce_{0.9}Gd_{0.1}O_{1.95}$ (CGO) powder, which, when sintered, provides a porous composite structure with three interpenetrating percolation networks (see V. Dusastre and J. A. Kilner, Solid State Ionics, 126, 1999, 163). The mean particle size of the powders of the cathode composition is in the range of from 0.1 to 10 $\mu$m, preferably in the range of from 0.1 to 1 $\mu$m. Other electrode materials include $La_{0.5}Sr_{0.5}CoO_{3-\delta}$, $Gd_{0.5}CoO_3$-$\delta$ and $Sm_{0.5}Sr_{0.5}CoO_{3-\delta}$.

The fuel cell 1 further includes an electrolyte film 13, in this embodiment having a thickness of from 10 to 20 $\mu$m, deposited over the cathode layer 11 so as to extend beyond the periphery thereof, again using conventional ceramic processing techniques. In one embodiment the electrolyte film 13 is fabricated from a composition comprising 98 mole % CGO and 2 mole % cobalt oxide. The materials of the cathode layer 11 and the electrolyte film 13 once deposited are then sintered at a sintering temperature of about 950° C. in a neutral atmosphere to prevent excessive oxidation of the foil substrate 3, This sintering temperature has been found to be sufficient, as disclosed in EP-A-1000913, to allow the CGO/cobalt oxide composition to sinter to provide a dense impermeable electrolyte film 13. By using CGO as the material for the electrolyte film 13, the thermal coefficients of expansion of the electrolyte film 13 and the foil substrate 3 are well matched, with CGO and ferritic stainless steel having coefficients of thermal expansion of $12.5 \times 10^{-6}$ $K^{-1}$, allowing the fuel cell to withstand rapid temperature cycling which is a major advantage for small fuel cell stacks likely to encounter such operating conditions, such as incorporated in an APU of a vehicle. Providing the density of the deposited electrolyte is sufficiently high (>about 60% theoretical density) then it is also possible to use an appropriate CGO electrolyte powder without cobalt oxide additions. Also, significantly, the fuel cell 1 can be operated at temperatures of 500° C. or lower.

The fuel cell 1 further includes a further porous electrode layer 17, in this embodiment an anode layer having a thickness of from 10 to 25 $\mu$m, deposited on the electrolyte film 13, again using conventional ceramic processing techniques. In this embodiment the anode layer 17 is fabricated from a composition comprising 50 vol % of NiO and 50 vol % of CGO. The material of the anode layer 17 once deposited is then sintered at a temperature of about 900° C. to provide a porous composite structure with three interpenetrating percolation networks. Other materials for the electrodes, such as the perovskites discussed above, are also possible.

The fuel cell 1 further includes a ferritic stainless steel bi-polar plate 19, having the same composition as the foil substrate 3, bonded to the non-porous, peripheral region 8 of the other surface 3b thereof. In bonding the periphery of the foil substrate 3 to the bi-polar plate 19, a seal is provided which acts to prevent the oxidant directly coming into contact with the fuel. In this embodiment the bi-polar plate 19 is for a simple cross-flow configuration with internal manifolds. In preferred embodiments the bi-polar plate 19 is machined from a thick plate or pressed from a metal sheet. Pressing from a thinner metal sheet has the advantage of reducing weight and thermal mass. In preferred embodiments the peripheral region 8 of the foil substrate 3 is welded (e.g. laser) or brazed to one, in this embodiment the upper, surface 19a of the bi-polar plate 19 to provide an excellent electrical contact. In a stack, the other, lower surface 19b of the adjacent bi-polar plate 19 is pressed against the porous anode layer 17 to establish electrical contact. In a preferred embodiment a thin interfacial metal layer, for example a foil, mesh or felt, and preferably of Ni, is provided between each anode layer 17 and lower surface 19b of the adjacent bi-polar plate 19 to ensure good electrical contact and effective current distribution. In this embodiment the bi-polar plates 19 of the fuel cell stack are coupled by spring loaded rods extending through the periphery thereof. By the provision of spring-loaded rods, the bi-polar plates 19 of the fuel cell stack can be maintained under a predetermined pressure. In this embodiment the fuel cell stack includes a high-temperature gasket 21 located between and about the periphery of each of the bi-polar plates 19 to prevent direct mixing of the air and fuel supplies in the internal gas manifolds.

As will be appreciated, operation at 500° C. enables the use of commercial compliant gasket materials which greatly simplifies design, assembly and operation of the fuel cell stack compared to fuel cell stacks operated at higher temperatures which require brittle glass or glass-ceramic seals. One such gasket material is Unilon™ as available from James Walker, Woking, Surrey. A further benefit of operation at 500° C. resides in the observation that degradation, in particular corrosion of the stainless steel, is much reduced, allowing the fuel cell stack to be operated for very extended periods of time, typically in excess of 40,000 hours. As the metallic foil substrate can easily be joined by brazing or welding to the metallic bi-polar plate then the fabrication of an array (e.g. 4×4) of individual cells onto a larger single bi-polar plate is relatively straight forward using conventional cheap metallic joining technologies. This provides a facile route to scaling-up the power generated in a single stack, and is another major advantage associated with the use of metallic substrates for SOFC cells. After optimisation of the electrode structure it is projected that performance of the metal supported single cell will match that recently reported for an anode supported single cell (C.Xia et al, Electrochemical and Solid-State Letters, 4, A52,2001).

Figure 4:
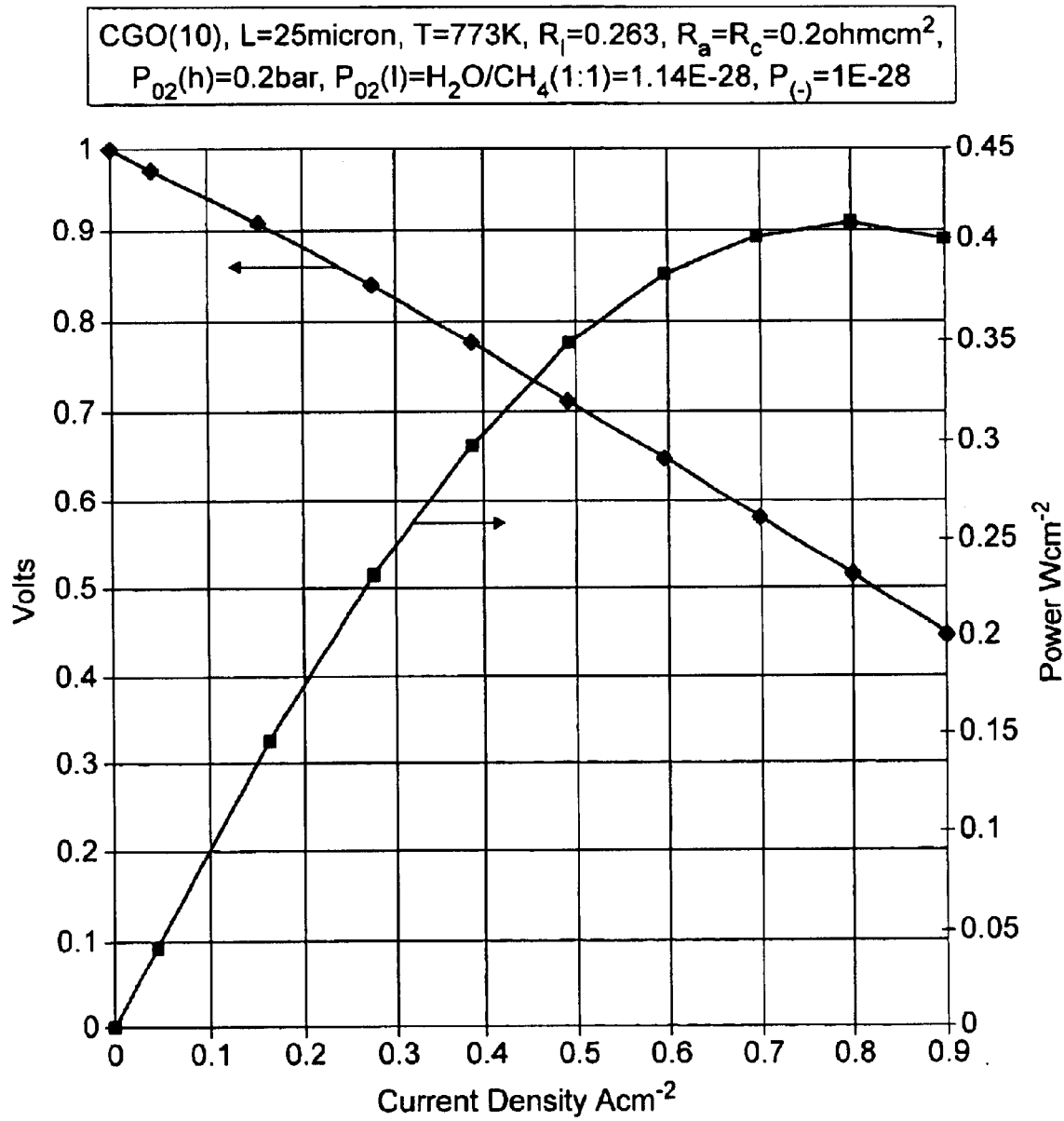
FIG. 4 illustrates projected I–V performance curves for single cell operation at 500° C.

FIG. 4 also illustrates projected I–V performance curves for single cell operation at 500° C. It will be significantly noted that specific power densities as high as 0.4 $Wcm^{-2}$ should be attainable at this temperature. However the SOFC can be operated over a range of temperatures (e.g. 400–600C) producing power densities ranging from 0.1–0.5 $Wcm^{-2}$. The performance will depend upon the fuel used, fuel utilisation, and operational design features for a specific application.

Figure 5:
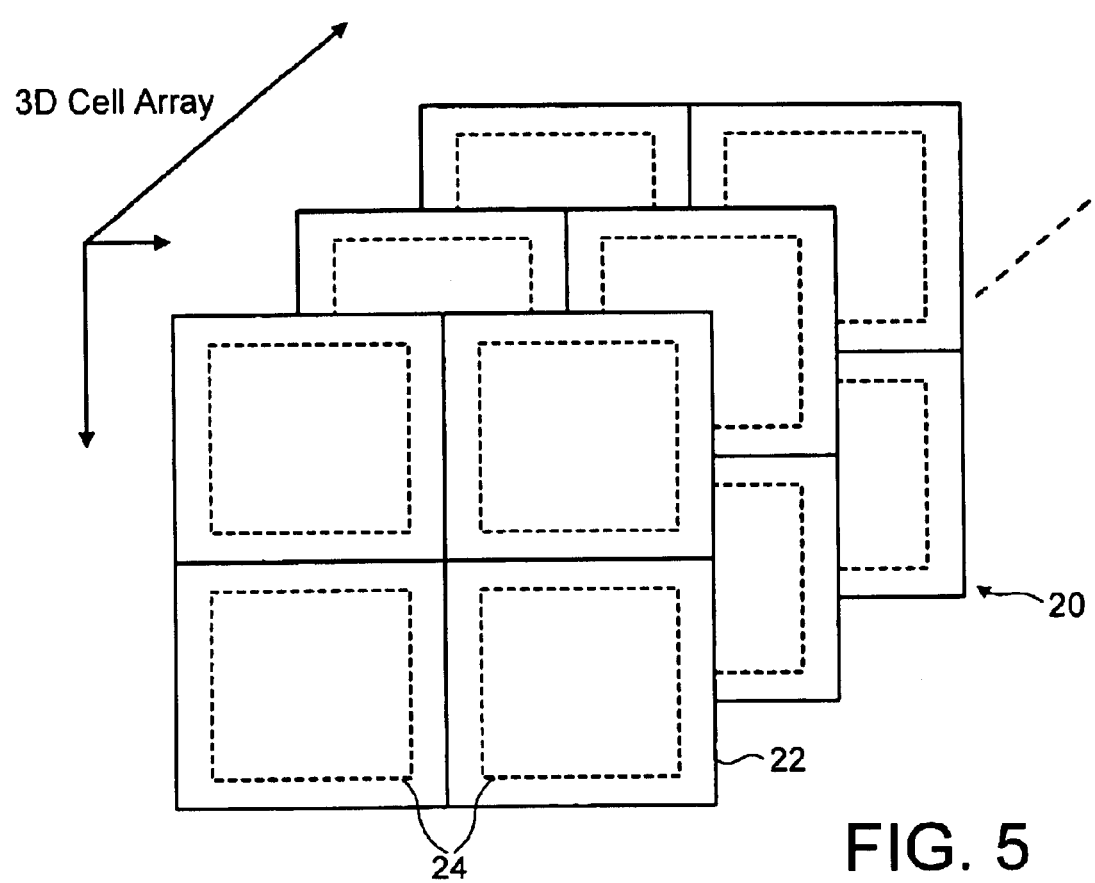
FIG. 5 illustrates a stack with each substrate layer carrying an array of cells.

FIG. 5 schematically illustrates a fuel cell stack 20 in which each substrate layer 22 carries an array of cells 24 formed of a first electrode, an electrolyte and a second electrode over a porous metal foil region. One metal foil with multiple porous regions may be fixed to the substrate 22 by, for example, welding at the edges with tack welds in central regions.

This array arrangement allows the ceramic cells to be smaller in area so reducing problems due to shrinkage and cracking whilst the total power that can be generated from each layer in the stack is increased. The array approach facilitates scaling of the design to achieve higher power outputs.

Finally, it will be understood that the present invention has been described in its preferred embodiment and can be modified in many different ways without departing from the scope of the invention as defined by the appended claims.

In one modification, the electrode layers 11, 17 could be formed of duplex or graded compositions to promote the electrode performance.

In another modification, the cathode and anode electrode layers 11, 17 could be reversed such that the anode layer 17 is located on the foil substrate 3 and the cathode layer 11 is located on the electrolyte layer 13. This could in some circumstances facilitate easier manufacture and be preferred. The anode composition is formulated to be chemically stable when exposed to the reducing environment imposed by the gaseous fuel. During the fabrication of the dense electrolyte film on the metallic foil substrate a neutral atmosphere is usually used in the sintering furnace, and the anode compositions are thus generally more suited to this situation than the cathode compositions. Selected cathode compositions could be irreversibly degraded when exposed to the neutral sintering atmospheres at elevated temperatures.

In a further modification, the fuel cell 1 could be of other shape than square, for example, round.

Also, in a yet further modification, the present invention could be applied to a circular fuel cell design including a central manifold.

In a still further modification, the fuel cell 1 could be fabricated by co-sintering the material of the electrode layers 11, 17 and the electrolyte layer 13.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A solid oxide fuel cell, comprising:
   (i) a ferritic stainless steel substrate including a porous region and a non-porous region bounding the porous region;
   (ii) a ferritic stainless steel bi-polar plate located under one surface of the porous region of the substrate and being sealingly attached to the non-porous
   (iii) region of the substrate about the porous region thereof;
   (iv) a first electrode layer located over the other surface of the porous region of the substrate;
   (v) an electrolyte layer located over the first electrode layer; and
   (vi) a second electrode layer located over the electrolyte layer.

2. The fuel cell of claim 1, wherein the ferritic stainless steel is a ferritic stainless steel containing no aluminium.

3. The fuel cell of claim 1, wherein the ferritic stainless steel is a titanium/niobium stabilised ferritic stainless steel.

4. The fuel cell of claim 3, wherein the ferritic stainless steel contains from about 17.5 to 18.5 wt % Cr (European designation 1.4509).

5. The fuel cell of claim 1, wherein the substrate has a thickness of from about 50 to 250 $\mu$m.

6. The fuel cell of claim 5, wherein the substrate has a thickness of from about 50 to 150 $\mu$m.

7. The fuel cell of claim 6, wherein the substrate has a thickness of about 100 $\mu$m.

8. The fuel cell of claim 1, wherein the porous region of the substrate includes a plurality of through apertures fluidly interconnecting the one and other surface of the substrate.

9. The fuel cell of claim 8, wherein the apertures are uniformly spaced.

10. The fuel cell of claim 8, wherein the apertures have a lateral dimension of from about 5 to 250 $\mu$m.

11. The fuel cell of claim 10, wherein the apertures have a lateral dimension of from about 20 to 50 $\mu$m.

12. The fuel cell of claim 11, wherein the apertures have a lateral dimension of about 30 $\mu$m.

13. The fuel cell of claim 8, wherein the apertures comprise from about 30 to 65 area % of the porous region of the substrate.

14. The fuel cell of claim 13, wherein the apertures comprise from about 50 to 55 area % of the porous region of the substrate.

15. The fuel cell of claim 1, wherein the substrate includes an active coating of an electronically-conductive oxide.

16. The fuel cell of claim 15, wherein the active coating is a perovskite oxide mixed conductor.

17. The fuel cell of claim 16, wherein the perovskite oxide mixed conductor comprises $La_{1-x}Sr_xCo_yFe_{1-y}O_{3-\delta}$, where $0.5 \geq x \geq 0.2$ and $0.3 \geq y \geq 0$.

18. The fuel cell of claim 17, wherein the perovskite oxide mixed conductor comprises one of $La_{0.6}Sr_{0.4}Co_{0.2}Fe_{0.8}O_{3-\delta}$ (LSCF), $La_{0.5}Sr_{0.5}CoO_{3-\delta}$, $Gd_{0.5}CoO_{3-\delta}$, and $Sm_{0.5}Sr_{0.5}CoO_{3-\delta}$.

19. The fuel cell of claim 15, wherein the active coating comprises doped $LaMnO_3$.

20. The fuel cell of claim 1, wherein the substrate includes a recess in which the first electrode layer is at least partially located.

21. The fuel cell of claim 1, wherein the substrate comprises a foil.

22. The fuel cell of claim 1, wherein the substrate is a photo-chemically machined substrate and/or laser machined.

23. The fuel cell of claim 1, wherein one or both of the first and second electrode layers has a thickness of from about 10 to 25 $\mu$m.

24. The fuel cell of claim 23, wherein one or both of the first and second electrode layers has a thickness of from about 10 to 15 $\mu$m.

25. The fuel cell of claim 1, wherein one or both of the first and second electrode layers is a sintered material.

26. The fuel cell of claim 25, wherein one of the first and second electrode layers comprises a sintered powdered mixture of perovskite oxide mixed conductor and rare earth-doped ceria.

27. The fuel cell of claim 25, wherein the powdered mixture comprises about 60 vol % of perovskite oxide mixed conductor and about 40 vol % of rare earth-doped ceria.

28. The fuel cell of claim 27, wherein the perovskite oxide mixed conductor comprises $La_{1-x}Sr_xCo_yFe_{1-y}O_{3-\delta}$, where $0.5 \geq x \geq 0.2$ and $1 \geq y \geq 0.2$.

29. The fuel cell of claim 28, wherein the perovskite oxide mixed conductor comprises of $La_{0.6}Sr_{0.4}Co_{0.2}Fe_{0.8}O_{3-x}$ (LSCF), $La_{0.5}Sr_{0.5}CoO_{3-\delta}$, $Gd_{0.5}CoO_{3-\delta}$. and $Sm_{0.5}Sr_{0.5}CoO_{3-\delta}$.

30. The fuel cell of claim 26, wherein the rare earth-doped ceria comprises $Ce_{1-x}RE_xO_{2-x/2}$, where RE is a rare earth and $0.3 \geq x \geq 0.05$.

31. The fuel cell of claim 30, wherein the rare earth-doped ceria comprises $Ce_{0.9}Gd_{0.1}O_{1.95}$.

32. The fuel cell of claim 26, wherein the one of the first and second electrode layers is the first electrode layer provided as a cathode layer.

33. The fuel cell of claim 26, wherein the other of the first and second electrode layers comprises a sintered powdered mixture of NiO and rare earth-doped ceria.

34. The fuel cell of claim 33, wherein the powdered mixture comprises about 50 vol % of NiO and about 50 vol % of rare earth-doped ceria or un-doped ceria.

35. The fuel cell of claim 33, wherein the rare earth-doped ceria comprises $Ce_{1-x}RE_xO_{2-x/2}$, where RE is a rare earth and $0.3 \geq x \geq 0.05$.

36. The fuel cell of claim 33, wherein the other of the first and second electrode layers is the second electrode layer provided as an anode layer.

37. The fuel cell of claim 36, wherein the rare earth-doped ceria comprises $Ce_{0.9}Gd_{0.1}O_{1.95}$.

38. The fuel cell of claim 1, wherein the electrolyte layer has a thickness of from about 5 to 30 $\mu$m.

39. The fuel cell of claim 1, wherein the electrolyte layer comprises a sintered powdered mixture of rare earth-doped ceria and cobalt oxide.

40. The fuel cell of claim 39, wherein the sintered powdered mixture comprises about 98 mole % rare earth-doped ceria and about 2 mole % cobalt oxide.

41. The fuel cell of claim 39, wherein the rare earth-doped ceria comprises $Ce_{1-x}RE_xO_{2-x/2}$, where RE is a rare earth and $0.3 \geq x \geq 0.05$.

42. The fuel cell of claim 41, wherein the rare earth-doped ceria comprises $Ce_{0.9}Gd_{0.1}O_{1.95}$.

43. The fuel cell of claim 1, wherein the electrolyte layer comprises a sintered layer of doped ceria.

44. The fuel cell of claim 1, wherein an array of elements each comprising a first electrode layer, an electrolyte layer and a second electrode layer are provided upon said substrate.

45. A fuel cell stack comprising a plurality of the fuel cells in claim 1.

* * * * *